June 19, 1956
C. O. THOMPSON ET AL
2,751,004
FILM CUTTER HAVING A KNIFE AND A TRANSPORT
BLOCK FOR ADVANCING FILM TO THE KNIFE
Filed March 19, 1953
2 Sheets-Sheet 1
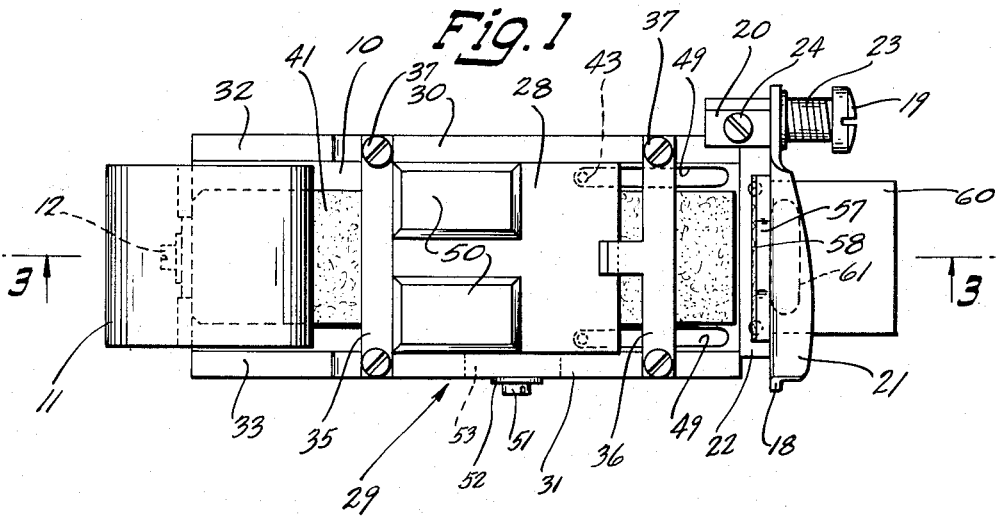
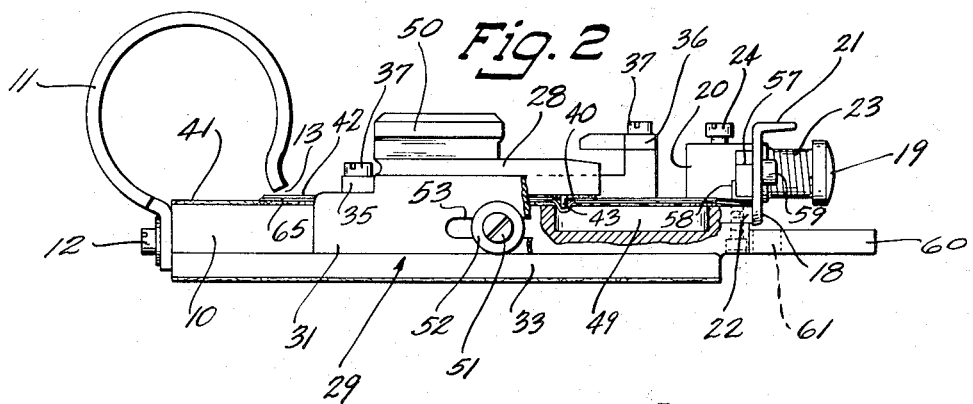
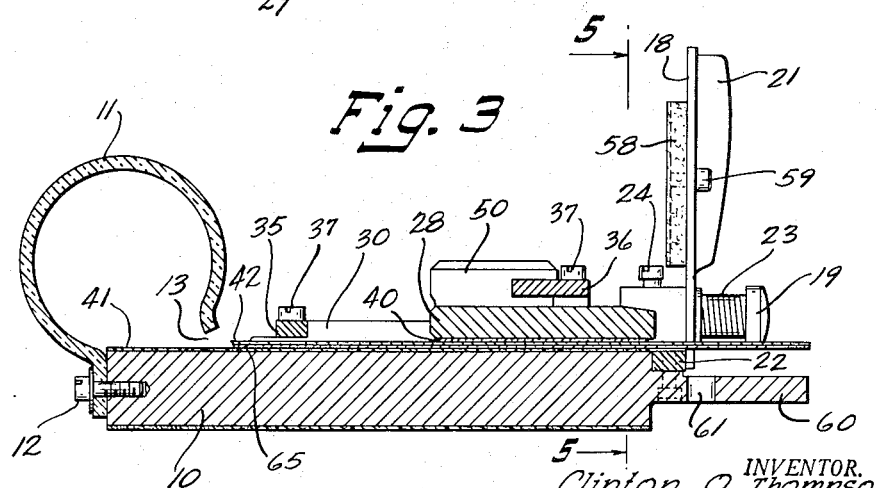
INVENTOR.
Clinton O. Thompson
Selma C. Thompson
BY
April M. Hajewski
Attorney June 19, 1956  C. O. THOMPSON ET AL  2,751,004
FILM CUTTER HAVING A KNIFE AND A TRANSPORT
BLOCK FOR ADVANCING FILM TO THE KNIFE
Filed March 19, 1953  2 Sheets-Sheet 2
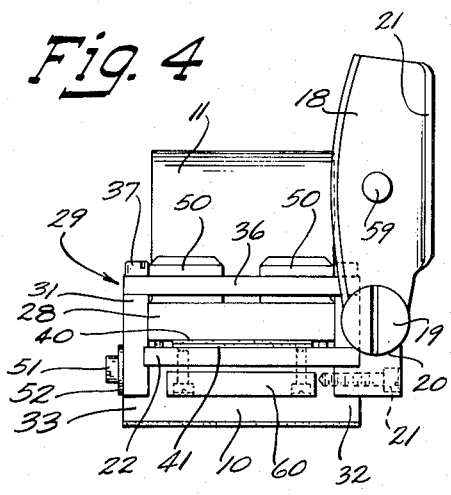
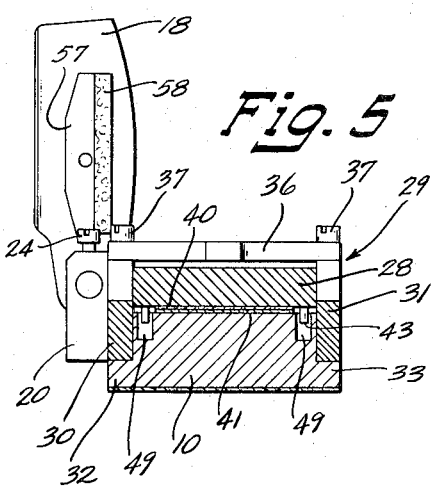
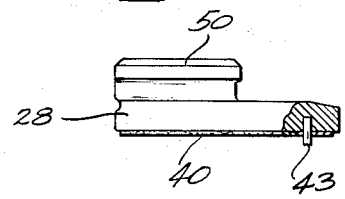
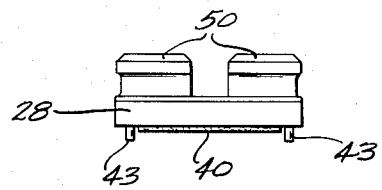
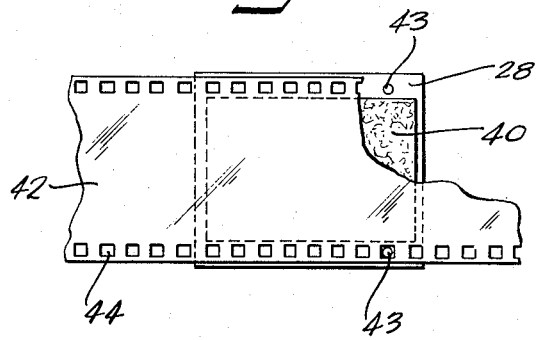
INVENTORS.
Clinton O. Thompson
Selma C. Thompson
BY Cyril M. Hajewski
Attorney United States Patent Office 2,751,004
Patented June 19, 1956

2,751,004

FILM CUTTER HAVING A KNIFE AND A TRANSPORT BLOCK FOR ADVANCING FILM TO THE KNIFE

Clinton O. Thompson and Selma C. Thompson, Cudahy, Wis.

Application March 19, 1953, Serial No. 343,359

5 Claims. (Cl. 164—42)

This invention relates generally to a film cutter, and more particularly to an improved cutter for separating frames of film from a continuous roll.

In most types of photography it is the practice to load the camera with a roll of film in the form of a continuous strip and expose the film in parts so that a number of individual pictures are recorded on the roll. After exposure the roll of film is developed, and upon completion of the developing process, the film is cut to separate the individual pictures from the continuous strip. In some instances it is essential that the cutting of the frames of film off of the continuous strip be accomplished accurately along the line of demarcation, and that the cut be square with the other edges. For example, in stereoscopic photography, it is especially important that the frames of film be cut accurately, as two frames of film are mounted on one slide to form a single picture, and the two frames must be accurately aligned on the slide if they are to form a good picture. This is especially true if the picture is to be projected.

Furthermore, it is presently the standard practice to use 35 mm. film for stereoscopic photography as well as for transparencies to be mounted on a slide for two dimensional viewing in a viewer or by projection. In either case these pictures are magnified for comfortable viewing either in a viewer or in a projector. Any dirt or scratches on the transparency are therefore also magnified, and become a source of annoyance in this type of photography. For this reason it is also important that the frames of film be kept free of dirt or scratches while being cut, and that they be subjected to a minimum of handling to prevent smearing.

It is therefore a general object of the present invention to provide an improved cutter for cutting frames of film from a continuous roll.

Another object of the present invention is to provide a film cutter with an improved mechanism for advancing the film to the cutting knife.

Another object of the present invention is to provide an improved film cutter especially adapted for accurately cutting the individual frames of film off of a continuous roll along their lines of demarcation so that the severed edges are square with the other two edges of the frame.

Another object is to provide an improved film cutter which may be readily manipulated for rapid operation to accurately cut a continuous roll of film into individual frames of the same length.

A further object is to provide an improved film cutter which offers maximum protection to the film from dust and scratches.

A further object is to provide an improved film cutter which is efficient in operation but of simple and inexpensive construction.

According to this invention there is provided an improved film cutter especially adapted for cutting the individual frames of film off of a continuous strip of 35 mm. film or other relatively small size film having sprocket holes. The presence of sprocket holes in the film is taken advantage of for accurately advancing the film toward the cutting knife a preestablished distance, so that the several frames will be substantially identical in length, and accurately separated along their respective lines of demarcation. The film cutter comprises a knife mounted on the end of a base for pivotal movement to effect a cutting operation, and a transport block or slide, slidably mounted on the base for advancing the film the predetermined distance toward the knife. The transport block is supported on the base between a front and rear stop which limit its movement in both directions the prescribed amount. Two pins extend downwardly from the transport block in spaced relationship in conformity to the spacing of opposite sprocket holes on the film. To advance the film the desired distance the transport block is placed in abutment with its rear stop and lowered to insert its two pins into a pair of sprocket holes. It is then slid forwardly into abutment with its forward stop, the film being moved with it by reason of its engagement with the two pins. Upon completion of the cutting operation the block is raised to withdraw the pins from the sprocket holes and the operation is repeated to produce another increment of movement. In this manner the frames of film are accurately separated from the roll with a very minimum of handling.

The foregoing and other objects of the invention, which will become apparent from the following detailed specification setting forth an illustrative embodiment, may be achieved by the particular apparatus depicted in and described in connection with the accompanying drawings, in which:

Figure 1 is a plan view of a film cutter embodying the present invention, with the transport block being shown in its rearward position;

Figure 2 is a view substantially in side elevation of the film cutter shown in Figure 1, with parts broken away to depict the location of the transport block pins when the transport block is in its rearward position;

Figure 3 is a view substantially in vertical section taken along the plane represented by the line 3—3 in Figure 1, except that the transport block is shown in its forward position;

Figure 4 is a view in front elevation of the film cutter illustrated in Figure 1;

Figure 5 is a view partly in elevation and partly in vertical section taken along the plane represented by the line 5—5 in Figure 3;

Figure 6 is a view substantially in side elevation, of the transport block shown assembled to the film cutter in Figures 1–5;

Figure 7 is a view in front elevation of the transport block illustrated in Figure 6; and Figure 8 is a bottom view of the transport block with a fragmentary strip of film, showing the relative position of the transport block with respect to the film when operating on the film cutter.

Referring now more particularly to the drawings and especially to Figures 1 to 3 thereof, the film cutter there shown as an embodiment of the present invention comprises a base 10 which serves as the supporting structure for the operating mechanism. A film container 11 of cylindrical configuration is fixed to one end of the base 10 by a screw 12 for receiving the roll of film from which the frames of film are to be cut. Although the film container 11 is in the form of a cylinder, its body does not follow the path of a complete circle as would a true cylinder, but is terminated before completing the circle to present an edge directly above the base 10 and form an opening 13 through which the film may be drawn from the film container 11 onto the top surface of the base 10.

The opposite end of the base 10 supports a cutting knife 18 for pivotal movement about a screw 19 which is threaded in a bracket 20, the latter being secured to the base 10 at its side by suitable screws 21 as shown in Figure 4. The upper edge of the knife 18 is provided with a flange 21 for facilitating its manipulation. The knife 18 is shown in its upper position in Figure 3, and is pivoted downwardly from this position so that its edge passes along the edge of a cutting bar 22 to effect the cutting operation, the cutting bar being secured to the base 10. The film is positioned so that the line along which it is to be cut is in alignment with the edge of the cutting bar 22 which cooperates with the knife 18 to effect the cutting action as the knife passes by.

For efficient operation, it is essential that the knife 18 be in contact with the edge of the cutting bar 22 as the cutting operation is performed. To this end, a coil spring 23 is placed on the screw 19 between the knife and the head of the screw to yieldably urge the knife toward the left, as viewed in Figures 1 to 3, into contact with the edge of the cutting bar 22. With this arrangement the operation of the knife is very efficient to cleanly cut the film along the line placed in alignment with the edge of the cutting bar 22. Rotation of the screw 19 with the knife 18 as it is pivoted, is precluded by a locking screw 24 threaded into the top of the bracket 20 to bear against the portion of the screw 19 within the bracket 20 and thereby firmly clamp the screw 19 in position.

Advancement of the film the desired distance after the completion of each cutting operation is obtained by manipulating a transport block or slide 28, slidably mounted on the base 10 within an adjustable spacing carriage generally denoted by the reference numeral 29. The spacing carriage 29 is positioned to straddle the base 10 and comprises a side member 30 disposed on one side of the base 10, and a side member 31 on the other side of the base. The side members 30 and 31 rest upon a pair of side extensions 32 and 33 respectively, formed on either side of the bottom of the base 10, the side members being supported on the extensions 32 and 33 for sliding movement so that the entire spacing carriage may be adjusted longitudinally relative to the base 10.

The side members 30 and 31 are connected together by a pair of stop bars 35 and 36 secured to the top edges of the side members 30 and 31 by suitable screws 37, the stop bars being located at the ends of the side members. The stop bar 35 serves as a rear stop and the stop bar 36 serves as a forward stop for limiting the movement of the transport block 28 in both directions so that it can slide between the stop bars only, a distance conforming to the length of the frames of film.

The film is drawn along the top surface of the base 10, and underneath the transport block 28 between the side members 30 and 31. For the protection of the film, the bottom surface of the transport block 28 is provided with a felt pad 40 securely cemented thereto, and in like manner a felt pad 41 is cemented to the top surface of the base 10.

As previously mentioned, the transport block 28 serves to advance the film, identified in the drawings by the reference numeral 42, along the base 10 in increments corresponding to the length of the frames. To this end, the transport block 28 is provided with a pair of downwardly extending pins 43 secured to the block in spaced relationship corresponding to the spacing of sprocket holes 44 formed in the film 42. As clearly illustrated in Figure 8, the pins 43 are inserted into a pair of sprocket holes 44 to engage the film so that it will move with the transport block 28 along the base 10. Since the pins 43 extend beneath the bottom of the transport block 28, a pair of slots 49 are formed in the base 10 to provide clearance for the pins throughout their distance of movement.

The rearward movement of the transport block 28 is limited by the stop bar 35 against which its back surface abuts. It will be noted that the stop bar 36 is disposed at a higher level than the stop bar 35 so that the front portion of the transport block may slide underneath it into proximity with the knife 18. With this arrangement the transport block functions to hold the film close to the knife while the cut is being made to insure that the portion of the film between the transport block and the knife is held flat against the base 10 and the cutting bar 22 for greater accuracy.

Since the front portion of the transport block 28 does not abut the stop bar 36, the transport block is provided with a pair of upstanding abutments 50 which cooperate with the stop bar 36 to limit the forward movement of the transport block 28. In addition to functioning as an abutment for limiting the forward movement, the abutments 50 serves as a convenient grasping means for facilitating manipulation of the transport block 28.

The cutting operation is permitted while the transport block 28 is in its forward position holding the film against the base 10, with the pins 43 in engagement with one of the pairs of sprocket holes 44 in the film 42. It is therefore necessary that when the transport block 28 is in this position, that a separation line between the frames of film be in accurate alignment with the cutting edge of the cutting bar 22. For this reason the spacing carriage 29 is slidably mounted on the base 10 so that it may be moved relative thereto for the purpose of placing the separation line of the first frame of film on the roll, in alignment with the cutting edge of the cutting bar 22.

This aligning must take place while the pins 43 are in engagement with one of the pairs of sprocket holes 44 and while the transport block 28 is in one of its extreme positions. It is, of course, more convenient to place the transport block 28 in its extreme forward position with the abutments 50 in contact with the forward stop bar 36. With the transport block 28 in this position, the entire spacing carriage assembly 29 is slid along the base 10 until the line of demarcation separating the first frame of film from the roll is in alignment with the cutting edge of the cutting bar 22.

When the spacing carriage 29 is thus positioned, it is locked in place by a locking screw 51 and washer 52. The locking screw 51 passes through a slot 53 formed in the side member 31, into threaded engagement with a tapped hole provided in the base 10. As the locking screw 51 is tightened it locks the entire spacing carriage 29 to the base 10. All subsequent movements of the transport block 28 from its maximum rearward position to its maximum forward position while engaging the film, will move another separation line of the film into accurate alignment with the edge of the cutting bar 22 without further adjustment of the spacing carriage 29 until the entire roll of film has been separated into its individual frames.

As a matter of fact, it has been found that once the spacing carriage 29 has been adjusted, as described above, for a particular roll of film, further adjustments are not necessary for subsequent rolls of film exposed by the same camera. It is only necessary to readjust the spacing carriage 29 when a roll of film exposed by another camera is to be operated upon. The sprocket holes 44 will maintain the same relationship with respect to the individual frames in all film exposed by the same camera. This relationship will vary however, in different cameras, necessitating an adjustment of the spacing carriage 29.

When the cutting operation is completed, the transport block 28 is in its forward position as illustrated in Figure 3, with the abutments 50 in contact with the forward stop bar 36. It is then necessary to reposition the transport block to its rearward position without moving the film. It will be noted that sufficient clearance is provided under the stop bar 36 to permit the transport block 28 to be raised slightly to withdraw the pins 43 from the sprocket holes 44 with which they were engaged. It has been found that this withdrawal of the pins 43 from the sprocket holes 44 may be most conveniently accomplished by simply pivoting the transport block 28 upwardly about its left bottom edge as viewed in Figure 3.

With the pins 43 withdrawn from the sprocket holes, the transport block 28 is moved rearwardly until its abuts the stop bar 35 as illustrated in Figure 2. When it reaches this position, it is again lowered to insert the pins 42 into the pair of sprocket holes 44 which is then in alignment with the pins. The transport block 28 may then be again moved forwardly until the abutments 50 come into contact with the forward stop bar 36. Since the pins 43 are in engagement with the sprocket holes 44, the film will move with the transport block to accurately advance one frame, and position the next separation line in alignment with the cutting edge of the cutting bar 22, so that the succeeding frame of film may be accurately separated from the roll.

It is essential that the film 42 be securely held in position to prevent it from shifting while the transport block 28 is being moved back to its rearward position. For this purpose, the knife 18 is provided with a hold down pad 57 having a felt covering 58 on its bottom surface for the protection of the film. The hold down pad 57 is secured to the side of the knife 18 by a screw 59, and is positioned so that after a cutting operation is completed by pivoting the knife downwardly, the hold down pad 57 rests flat against the end of the film. By exerting a slight pressure on the knife, the end of the film may be firmly held between the hold down pad 57 and the cutting bar 22 to prevent it from moving while the transport block 28 is moved back to its rear position.

The frame of film which is to be separated from the roll extends beyond the base 10 over an apron 60 as clearly shown in Figure 3. The apron 60 serves to receive the frame of film when it is separated from the roll to prevent any possible damage to the film. The operator may then conveniently remove the frame from the apron 10.

As previously mentioned, it is necessary to align the separation line of the first frame of the roll with the cutting edge of the cutting bar 22. To facilitate this aligning operation, the apron 60 is provided with a slot 61 at its inner edge beneath the cutting bar 22 to admit light to the underside of the film. The light admitted by the slot 61 renders the separation line clearly visible to the operator so that it may be accurately positioned.

The processed film is usually received with a strip of paper rolled with the film for its protection. It is advantageous to cut the paper with the film to maintain this protection. When the film is withdrawn from the container 11, it is withdrawn with the paper strip underneath the film, the paper being identified by the reference numeral 65 in Figures 2 and 3. When this is done, the paper protects the emulsion side of the film, and as the film is moved forwardly, the paper, rather than the film, slides along the felt pad 41 to preclude scratching, or otherwise marring the film.

The paper strip 65 does not have the sprocket holes 44 formed therein, and the pins 43 therefore do not extend through the paper, but, as illustrated in Figure 2, merely force it away from the film a slight amount in the area where they engage the sprocket holes 44. As the individual frames are separated from the roll by the knife 18, the paper it cut with the frame, and has a marked tendency to adhere to the emulsion side of the film. Thus, as the frame falls to the apron 60, it is the paper 65 that contacts the surface of apron rather than the film itself. The frame of film may then be stored with the paper adhering to it for continued protection, until the frame is to be mounted or otherwise used, when the paper may be simply peeled off.

To summarize the method of operation, the processed roll of film is placed in the container 11 so that the film may be withdrawn therefrom through the opening 13 with the paper backing 65 underneath the film in contact with the felt pad 41 of the base 10. The film 42, together with its paper backing 65, is advanced along the base 10, and the first separation line of the film along which the first cut is to be made, is placed in approximate alignment with the edge of the cutting bar 22. The transport block 28 is then moved to its forward position, into abutment with the stop bar 36, and moved back from this position a slight amount until its associated pins 43 drop into a pair of sprocket holes 44.

When a pair of sprocket holes 44 is thus engaged, the transport block 28 is returned to its forward position into engagement with the stop bar 36, moving the film 42 with it. If the first separation line of the film is now not in alignment with the edge of the cutting bar 22, the locking screw 51 is loosened to release the spacing carriage 29 from the base 10. With the transport block 28 firmly abutting the forward stop bar 36, and its pins 43 in engagement with a pair of sprocket holes 44, the entire spacing carriage 29 is adjusted relative to the base 10, to bring the first separation line of the film into accurate alignment with the edge of the cutting bar 22.

Upon achieving such alignment, the locking screw 51 is again tightened to clamp the spacing carriage 29 to the base 10. With the transport block 28 in its forward position and a slight downward pressure exerted upon it to firmly hold the film against the base 10, the knife 18 is pivoted downwardly, to effect the first cut through both the film 42 and the paper 65. The severed portion of the film will then drop upon the apron 60 for convenient removal.

In effecting the cut, the knife is pivoted downwardly as far as it will go so that its hold down pad 57 bears against the end of the film 42 to secure it between the pad 57 and the cutting bar 22. While a slight downward pressure is placed upon the knife 18 to thus firmly hold the film 42, the transport block 58 is pivoted slightly to withdraw the pins 43 from the sprocket holes 44 with which they are engaged, and the transport block 28 is shifted to its rear position into abutment with the rear stop bar 35. The transport block 28 is then pivoted again to lower the pins 43 into the pair of sprocket holes 44 which are then in alignment with them.

With the film thus reengaged, the knife 18 is pivoted upwardly and the transport block 28 is then moved to its forward position, into abutment with the forward stop bar 36, to advance the film accurately, exactly one frame, causing the next separation line to move into alignment with the edge of the cutting bar 22. The process is then repeated until all of the individual frames of film have been separated from the continuous roll.

From the foregoing detailed description of the structure and operation of the illustrative embodiment of the present invention, it will be apparent that a new and improved film cutter has been provided for rapidly separating the individual frames of film from a continuous roll with maximum accuracy for precision mounting as in stereoscopic slides.

Although the illustrative embodiment of the invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of the illustrative embodiment, the invention is hereby claimed as follows:

1. In a film cutter for cutting a continuous roll of photographic film into individual frames of the same length, a base, a knife operably mounted on said base to cut said film, a slide movably mounted on said base, film engaging means on said slide for selectively engaging said film for movement with said slide, and a pair of limit stops mounted on said base in position to limit the movement of said slide in either direction so that said slide is movable between said limit stops a distance conforming to the length of said individual frames, said limit stops being fixed relative to each other but adjustable as a unit relative to said base to adjust the location of the path of movement of said slide along the base whereby said film may be engaged for movement with said slide in one direction from one of said limit stops to the other, to advance the film the desired distance toward said knife, and the film may be released while the slide is moved in the opposite direction to its original position, to feed the film in the predetermined increments of movement toward the knife so that the individual frames of film will be accurately separated from the continuous roll.

2. In a film cutter for cutting a continuous roll of photographic film having sprocket holes into individual frames of the same length, a base, a knife operably mounted on said base in position to sever the film when actuated, a spacing carriage movably mounted on said base for adjusting its position along the length of the base, said spacing carriage including a pair of limit stops fixedly disposed in spaced relationship above the base, a transport block slidably mounted on said base between said limit stops so that its movement in each direction is limited by one of said limit stops to establish its path of travel, and a plurality of pins secured to said transport block in spaced relationship in accordance with the spacing of said sprocket holes so that they may be inserted into the sprocket holes to cause the film to move with the transport block, whereby the film may be advanced toward the knife in equal increments by sliding the transport block from one limit stop to the other with its pins in engagement with sprocket holes in the film, and the location of the path of travel of the transport block along the base may be adjusted by adjusting the spacing carriage to effect simultaneous movement of said limit stops with respect to the base without varying their spacing.

3. In a film cutter for cutting a continuous roll of photographic film having sprocket holes into individual frames of the same length, a base, a knife operably mounted on said base in position to sever the film when actuated, a transport block slidably mounted on said base, a plurality of pins secured to said transport block in spaced relationship in accordance with the spacing of said sprocket holes so that they may be inserted into the sprocket holes to cause the film to move with the transport block, a spacing carriage movably mounted on said base for adjusting its position along the length of the base, said spacing carriage including a pair of limit stops disposed in spaced relationship above the base with one limit stop located on each side of said transport block to limit its path of travel in each direction, and clamping means operably connected to selectively clamp said spacing carriage on said base to preclude its movement relative thereto, whereby the film may be advanced toward the knife in equal increments by sliding said transport block from one limit stop to the other with its pins in engagement with sprocket holes in the film, and the location of the path of travel of the transport block along the base may be adjusted by adjusting the spacing carriage to effect simultaneous movement of said limit stops with respect to the base without varying their spacing.

4. In a film cutter for cutting a continuous strip of photographic film into individual frames of the same length, a base, a knife operably mounted on said base in position to sever the film when actuated, a spacing carriage movably mounted on said base for adjusting its position along the length of the base, said spacing carriage including a pair of limit stops fixed thereto in spaced relationship and disposed above the base, a slide movably mounted on said base between said limit stops so that its movement in each direction is limited by one of the limit stops to establish its path of travel, and film engaging means on said slide for selectively engaging the film for movement with the slide, whereby the film may be advanced toward the knife in equal increments by moving the slide from one limit stop to the other with the film engaged, and the location of the path of travel of the transport block along the base may be adjusted by adjusting the spacing carriage with respect to the base to effect simultaneous movement of the limit stops relative to the base without varying their spacing.

5. In a film cutter for cutting a continuous roll of photographic film having sprocket holes into individual frames of the same length, a base, a film holder fixed to one end of said base for receiving the roll of film and having an opening through which the film may be withdrawn from the holder onto the base, a knife operably mounted on the other end of said base in position to sever the film underneath it when actuated, a spacing carriage supported by the base between the film holder and the knife for sliding movement to permit adjustment of its position along the length of the base, said spacing carriage including a pair of limit stops fixed thereto in spaced relationship and disposed above the base, a slide movably mounted on the base between said limit stops so that its movement in each direction is limited by one of said limit stops to establish its path of travel, a pair of pins secured to said slide in spaced relationship in accordance with the spacing of said sprocket holes so that they may be inserted into the sprocket holes to cause the film to move with the slide, and an apron secured to the end of the base adjacent to the knife in position to receive the frames of film as they are separated from the roll by the knife, whereby the film may be withdrawn from said holder and advanced toward the knife in equal increments corresponding to the length of said frames by moving the slide from one limit stop to the other with its pins in engagement with a pair of sprocket holes in the film, and the location of the path of travel of the slide along the base may be adjusted by adjusting the spacing carriage to effect simultaneous movement of said limit stops with respect to the base without varying their spacing.

References Cited in the file of this patent

UNITED STATES PATENTS

| | | |
|---|---|---|
| 345,052 | Harrison | July 6, 1886 |
| 679,167 | Garding | July 23, 1901 |
| 1,028,749 | Leeper | June 4, 1912 |
| 1,285,377 | Reavis | Nov. 19, 1918 |
| 1,293,979 | Templeton | Feb. 11, 1919 |
| 1,621,666 | Guenther | Mar. 22, 1927 |
| 2,021,038 | West | Nov. 12, 1935 |
| 2,301,054 | Laing | Nov. 3, 1942 |
| 2,518,069 | Roper | Aug. 8, 1950 |